United States Patent [19]
Decker et al.

[11] Patent Number: 6,025,030
[45] Date of Patent: *Feb. 15, 2000

[54] FLEXIBLE, WEATHERABLE, ACRYLIC COATING POWDER

[75] Inventors: Owen H. Decker, West Reading; Charles P. Tarnoski, Sinking Spring, both of Pa.

[73] Assignee: Morton International, Inc., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/061,933

[22] Filed: Apr. 17, 1998

Related U.S. Application Data

[62] Division of application No. 08/990,936, Dec. 15, 1997, which is a continuation of application No. 08/644,709, May 10, 1996, abandoned, which is a continuation-in-part of application No. 08/580,111, Jan. 25, 1996, abandoned, which is a continuation-in-part of application No. 08/396,313, Feb. 28, 1995, abandoned.

[51] Int. Cl.$^7$ .................................. B05D 3/02; B05D 7/06
[52] U.S. Cl. .............................................. 427/386; 427/393
[58] Field of Search ........................................ 427/393, 386

[56] References Cited

U.S. PATENT DOCUMENTS

| | | | |
|---|---|---|---|
| 3,245,925 | 4/1966 | Watson | 525/111.5 |
| 3,817,946 | 6/1974 | Ree . | |
| 4,339,571 | 7/1982 | Gutekunst et al. | 528/361 |
| 4,478,961 | 10/1984 | Tanaka et al. | 525/111 |
| 4,988,767 | 1/1991 | Pettit, Jr. | 525/111 |
| 5,008,335 | 4/1991 | Pettit, Jr. | 525/111 |
| 5,250,634 | 10/1993 | Toyoda et al. | 525/438 |
| 5,543,464 | 8/1996 | Decker et al. | 525/176 |

FOREIGN PATENT DOCUMENTS

| | | |
|---|---|---|
| 467559 | 1/1992 | European Pat. Off. . |
| 685541 | 12/1995 | European Pat. Off. . |
| 730012 | 9/1996 | European Pat. Off. . |

*Primary Examiner*—Erma Cameron
*Attorney, Agent, or Firm*—Wayne E. Nacker; Charles N. Lovell; Gerald K. White

[57] ABSTRACT

Coating powder compositions comprise A) between about 60 and about 90 wt %, relative to total weight of A) plus B) plus C), of an acrylic polymer having a weight average molecular weight of between about 1000 and about 30,000, a carboxylic acid equivalent weight of from about 300 to about 1000 and a glass transition temperature of about 45° C. or above and B) between about 5 and about 30 wt %, relative to total weight of A) plus B) plus C) of an adduct prepared from i) between about 20 and about 50 wt %, relative to total weight of i) plus ii), of a curing agent reactive with carboxylic acid groups and ii) between about 50 and about 80 wt %, relative to total weight of i) plus ii), of a polyester resin formed primarily from linear aliphatic diols and dicarboxylic acids, the polyester having functional groups reactive with said curing agent i), and C) between about 2 and about 30 wt % relative to the total weight of A) plus B) plus C) of a curing agent reactive with carboxylic acid groups. The sum of un-reacted functional groups of adduct B) plus curing agent C) is at a stoichiometric equivalent relative to said carboxylic acid functionality of said acrylic polymer A) of between about 0.5 and about 1.5.

Using sufficient amounts of an appropriate cure catalyst, the composition may be fused and cured at temperatures of 300° F. or below, even 250° C. or below, making the coating composition suitable for coating wood and wood products.

2 Claims, No Drawings

FLEXIBLE, WEATHERABLE, ACRYLIC COATING POWDER

This specification was filed on Apr. 17, 1998 as application Ser. No. 09/061,993; which is a Divisional of application Ser. No. 08/990,936 filed Dec. 15, 1997; which is a continuation of application Ser. No. 08/644,709 filed May 10, 1996, now abandoned; which is a continuation-in-part of application Ser. No. 08/580,111 filed Jan. 25, 1996, now abandoned; which is a continuation-in-part of application Ser. No. 08/396,313 filed Feb. 28, 1995, now abandoned.

The present invention is directed to acrylic coating powders and more particularly to acrylic coating powders which provide coatings having improved flexibility and weatherability.

BACKGROUND OF THE INVENTION

It is known to use acid-functional acrylic resins (e.g., S. C. Johnson SCX™-815, 817 and 819) cured with triglycidylisocyanurate (TGIC) or with hydroxyalkylamides as coating powder compositions. These coatings have many desirable properties such as: high hardness, good clarity, good chemical resistance, and excellent resistance to loss of gloss on outdoor exposure. A typical shortcoming of these coatings is low flexibility, and poor impact resistance.

"Hybrid" coatings have also been prepared in which the acrylic resin is blended with epoxy-functional resins, especially those derived from epichlorohydrin and bisphenol A. These coatings have many desirable properties, including good flexibility and impact resistance. However, they lose gloss in less than 500 hours when exposed to simulated outdoor weathering.

Coatings prepared from epoxy-functional acrylics, such as those from acrylic copolymers containing glycidyl methacrylate, are known to exhibit similar properties to those prepared from the acid-functional acrylics mentioned above. When cured, for example, with dodecanedioic acid, they are hard, clear, smooth, chemically resistant, and resistant to weather. They also exhibit the same drawback as the coatings from acid-functional acrylics, i.e. poor flexibility and poor impact resistance.

U.S. Pat. No. 3,817,946 discloses that the flexibility of glycidyl methacrylate-modified acrylics can be improved if a part of the polycarboxylic acid curing agent is replaced with a semicrystalline acid-functional polyester. Such materials were found to have two shortcomings. First, the powder showed a tendency to sinter. Second, the improvement in impact resistance and flexibility was marginal.

It is a general object of the present invention to provide a coating powder composition having resistance to weathering, and at the same time, good flexibility and impact resistance.

SUMMARY OF THE INVENTION

In accordance with the present invention, coating powders comprise A) between about 60 and about 90 wt %, preferably at least about 70 wt %, relative to total weight of A) plus B) plus C), of an acrylic polymer having a weight average molecular weight of between about 1000 and about 30,000, a carboxylic acid equivalent weight of from about 300 to about 1000, preferably at least about 500, and a glass transition temperature of about 45° C. or above, preferably about 60° C. or above, plus B) between about 5 and about 30 wt %, preferably between about 5 and about 25 wt % relative to total weight of A) plus B) plus C) of an adduct prepared from i) between about 20 and about 50 wt %, relative to total weight of i) plus ii), of a polyepoxy compound or a poly(beta-hydroxyalkyl amide) and compound ii) between about 50 and about 80 wt %, relative to total weight of i) plus ii), of a carboxylic acid-functional polyester resin reactive with said curing agent i), and C) between about 2 and about 30 wt. %, preferably between about 5 and about 20 wt % relative to the total weight of A) plus B) plus C) of a curing agent reactive with carboxylic acid groups, such that the total of unreacted functional groups of adduct B, plus the functional groups of the curing agent C) is at a stoichiometric equivalent relative to said carboxylic acid functionality of said acrylic polymer A) of between about 0.5 and about 1.5. To provide flexibility, at least about 90 wt % of the diols used to form the polyester ii) of adduct B) are linear aliphatic diols and at least about 90 wt % of the dicarboxylic acids used to form the polyester ii) of adduct B) are linear aliphatic dicarboxylic acids.

An additional feature of the present invention is that by addition of a suitable cure catalyst in sufficient amounts, the cure temperature of the composition may be about 300° F. (149° C.) or below and even 250° F. (121 ° C.) or below, making the compositions suitable for application to wood and wood products.

DETAILED DESCRIPTION OF CERTAIN PREFERRED EMBODIMENTS

Herein, unless otherwise stated, all amounts are expressed by weight and the term "phr" is a weight measurement which relates to the total amount of resin, including the acrylic resin A) plus curing agent/polyester resin adduct B) plus additional curative C).

The carboxylic acid functional acrylic resins A) useful in the invention are formed from typical acrylic monomers known in the art, such as methyl acrylate, methyl methacrylate, ethyl acrylate, acrylic acid, methacrylic acid, butyl acrylate, butyl methacrylate, etc. Styrene, α-methyl styrene, or vinyl toluene may also be incorporated, particularly to increase glass transition temperature of the acrylic polymer. The acrylic polymer typically has an ICI viscosity at 200° C. of between about 10 and about 80 poise. For processing to form the coating powder and for film forming, the acrylic polymer should have a typical softening point of about 130° C. or below. Acrylic polymers useful in the invention are commercially available, e.g., the above-mentioned SCX™ acrylic resins sold by S. C. Johnson.

The adduct B) is a pre-reacted product of the curing agent i) and the polyester ii). That is the adduct B) is formed before it is blended with the acrylic resin A). A coating powder formed by blending an acrylic acid A), an un-reacted curing agent i) and an un-reacted polyester ii) does not form a coating with good impact resistance, presumably because of some degree of phase separation of the acrylic resin A) and the polyester ii).

Suitable polyepoxy compounds i) which form part of adduct B) include heterocyclic polyepoxides such as triglycidylisocyanurate (TGIC); polyepoxides of aromatic polyols such as the diglycidyl ether of bisphenol A; cycloaliphatic polyepoxides; glycidyl esters of aromatic or aliphatic polyacids, such as the diglycidyl ester of hexahydrophthalic acid; low equivalent weight epoxy-functional acrylic resins; polyepoxides of aliphatic polyols such as the diglycidyl ether of 1,4-butanediol; and polyepoxides of amino-alcohols, such as the tri-glycidyl ether-amine of 4-amino phenol. Other aromatic polyols which may be used to prepare glycidyl ethers include such species as bisphenol F, and tetrabromobisphenol A, and the like. Polyepoxides from this category also include low molecular weight polymers derived from the above-named aromatic diols and their diglycidyl ethers. Cycloaliphatic polyepoxides include such compounds as 3',4'-epoxycyclohexylmethyl-3,4-epoxycyclohexyl carboxylate and dicyclopentadiene dioxide and the like.

Glycidyl esters of aromatic and aliphatic polyacids include glycidyl esters of such polyacids as, for example, terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, and methylhexahydrophthalic acid.

The epoxy-functional acrylates useful as curing agents i) may be produced by polymerizing epoxy-functional acrylates, e.g., glycidyl esters of acrylic acids, alone or in conjunction with other vinyl monomers, including other acrylic esters, styrene and substituted styrenes. The use of monomers having epoxy-reactive chemical groups, such as carboxylic acid and hydroxyl groups are avoided. Production, e.g. solution polymerization, of glycidyl-containing acrylic polymers of this type are described, for example, in U.S. Pat. No. 4,499,239, the teachings of which are incorporated herein by reference. Alternatively, an acrylic polymer having carboxylic acid functionality may be formed and epoxy-containing species subsequently grafted thereto. Glycidyl-containing acrylic polymers are also commercially available, e.g. resins sold under the Almatex trademark, PD-7690 by Anderson Development Co; and GMA-300, by Estron Chemical Co. For purposes of forming the adduct B), the epoxy-functional acrylate polymer should have a weight average molecular weight of between about 300 and about 2000 and epoxy equivalent weights of between about 120 and about 650, preferably in the range of about 120 to 400.

Suitable poly(beta-hydroxy alkyl amide)s which form part of adduct B) include tetrahydroxyethyl adipamide, the major component of a commercially available composition sold as Primid® XL-552, and similar Primid compositions.

Aliphatic polyols which may be used to prepare glycidyl ethers include, for example, ethylene glycol, propylene glycol, 1,3-butanediol, 1,4-butanediol, 1,6-hexanediol, neopentyl glycol, isopentyl glycol, trimethylolethane, trimethylolpropane, glycerol, pentaerythritol and 2,2,4-trimethylpentane-1,3-diol.

The polyester resin ii) which is used to form adduct B) may be either amorphous or semicrystalline, very preferably semicrystalline. The polyester resin may be carboxylic functional, having a carboxylic equivalent weight of between about 300 and about 3000, but may also be a polyester which has been modified to affix other functional groups, such as amino or thiol groups, by which it may be adducted to the curing agent.

Semi-crystalline polymers useful in accordance with the invention are described, for example, in International patent application WP 91/14745. Semi-crystalline polymers exhibit a heterogeneous morphology, i.e., crystalline and amorphous phases; and are typically opaque at ambient temperatures.

Specifically, a suitable semi-crystalline polyester is one with an onset of melt of between about 45° C. and about 120° C., preferably between about 55° C. and about 90° C., one or more $T_g$ values less than 55° C., a melting point of 50° C. to 200° C., preferably 60° to 130° C., an acid value of from 10 to 250 mg KOH per gram, a hydroxy number of no more than 11 mg KOH per gram and a number average molecular weight of between 600 and 20,000, preferably between 1000 and 2000. Preferably, the crystallinity of the polyester should be between about 20 and about 300 J/gm, preferably between about 60 and about 200 J/gm.

The preferred semi-crystalline polyesters useful in this invention are based on a polycondensation reaction of polyols with polycarboxylic acids or anhydrides, esters or acid chlorides based on these acids, using an excess of acid over alcohol so as to form a polyester with an acid number of at least 10, preferably from about 10 to about 250, and more preferably from about 60 to about 90, and with a hydroxyl number preferably less than 1. To provide the desired flexibility of the coating that is to be formed from the coating powder composition of the present invention, at least about 90 wt %, preferably 100%, of the polyols used to form the polyester ii) are linear aliphatic diols and at least about 90 wt %, preferably 100%, of the polycarboxylic acids used to form the polyester ii) are linear aliphatic dicarboxylic acids. However, minor amounts, e.g., up to 10 wt % of the polyol content and up to 10 wt % of the polycarboxylic acid content, may be other polyols and carboxylic acids, including trifunctional species and those containing cycloaliphatic, aromatic, and unsaturated groups.

Examples of suitable polyols for forming the polyester include 1,2-ethanediol, 1,3-propanediol, 1,4-butanediol, diethylene glycol, 1,6-hexanediol, neopentyl glycol, 1,10-decanediol, 1-4-cyclohexanedimethanol, trimethylolpropane, 2-methyl-1,3-propanediol, hydrogenated bisphenol A (or 2,2-(dicyclohexanol)propane), 2,2,4-trimethyl-1,3-pentanediol, 2-n-butyl-2-ethyl-1,3-propanediol, 3-hydroxy-2,2-dimethylpropyl 3-hydroxy-2,2-dimethylpropanoate (CA. Reg. No.=115-20-4), and 1,12-dodecanediol, 2-methyl-2-hydroxymethyl-1,3-propanediol and 2-ethyl-2-hydroxymethyl-1,3-propanediol. Suitable polycarboxylic acids which may be used include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid and naphthalene dicarboxylic acid.

Particularly suitable polyesters are formed from $C_6$–$C_{12}$ linear aliphatic dicarboxylic acids and diols, i.e., at least about 90 wt %, preferably 100%, of the polyols being $C_6$–$C_{12}$ linear aliphatic diols and at least about 90 wt %, preferably 100%, of the polycarboxylic acids being $C_6$–$C_{12}$ linear aliphatic dicarboxylic acids. One most particularly suitable polyester is a copolymer of hexanediol and 1,12-dodecanedioic acid of carboxyl equivalent weight of between about 400 and about 800. Such polyesters have onset of melt temperatures of about 55° C.

In addition to adduct B), additional curing agent C) is used at a curative equivalency relative to adduct B) of between about 3 and about 92%. Any of the curatives described above as suitable curing agents i) are suitable in non-adducted form as additional curative. Total curative functionality of adduct B) and curative C) should be at a stoichiometric equivalent of between about 0.5 and about 1.5 relative to the carboxylic acid functionality of the polymer. Additional curative C), is typically provided by reacting curing agent i) with polyester ii) such that when adduct B) is formed, substantial amounts of the curing agent remains unreacted with the polyester, leaving curing agent C). However, additional curative C) may be added, as required.

The coating powder may be clear, i.e., non-pigment-loaded, or may contain up to 200 wt % (200 phr) (though generally 120 wt % (120 phr) or less) of filler and/or pigment, relative to the weight of the total of the epoxy-functional polymer, the polyester and monomer curative. Filled compositions typically contain at least about 10 wt % filler and/or pigment, relative to the total of epoxy-functional polymer, polyester and monomer. In addition, the coating composition may contain conventional additives, e.g., antioxidants, light stabilizers, flow modifiers, costabilizer, etc., generally at a total level of about 10 phr or less.

Coating powders in accordance with the present invention are formed in a conventional manner. The components of the coating powder are combined and blended for not more than 15 minutes, to blend well. The blended materials are then extruded, e.g., at 100° C. in a single screw or twin screw extruder, allowed to cool, chipped, ground and screened to obtain a powder of appropriate particle size. Average particle size is typically 20–80 microns. Scalping at 100 mesh is typical to remove coarse particles. There is typically about 10% by weight of particles below 10 microns. The amount of material retained on a 325 mesh is typically between about 30 and 50 wt. %. The powder is then applied in a conventional manner, e.g., electrostatically, to a substrate. For purposes of the invention, electrostatic application of coating powder includes conventional methods, such as corona-discharge methods and tribocharging methods. The substrate is heated at the time of application and/or subsequently so that the coating particles melt, form a continuous film, and cure.

The coatings are applicable to conventional substrates, such as metal, e.g., steel or aluminum, and various polymers. In addition, as one aspect of the invention, by addition of a suitable catalyst, the cure temperature of the composition may be 300° F. or below and even 250° F. or below, temperatures consistent with application of the coating powder compositions to wood or wood products. Of course cure is time-dependent as well as temperature dependent; however, a full cure must be achieved within a reasonable time. Thus, for purposes of this invention, a cure time of 30 minutes at the cure temperature to achieve a full cure is considered reasonable, and temperatures of at or below 300° F., preferably at or below 250° F., for 30 minutes to effect a full cure is considered acceptable for wood applications. A "full cure" is a degree of curing achieved at which additional time at elevated temperature will not improve the properties of the coating once cooled to ambient temperatures. Suitable cure catalysts include, but are not limited to ethyltriphenylphosphonium bromide,triphenylphosphine and benzyltrimethylammonium chloride and epoxy adducts of z-methylimidazole. The amount of cure catalyst added to bring the cure temperature down to the temperature required for wood or a wood product will depend upon the particular composition, the catalyst of choice, and the appropriate maximum cure temperature for the particular product. Typically, so as to reduce the cure temperature to that appropriate for wood or wood product, between about 0.1 and about 10.0 wt % cure catalyst will be added based on total weight of A) plus B) plus C).

For purposes of this invention wood is defined herein as any lignocellulosic material whether it comes from trees or other plants and whether it be in its natural forms or its fibers have been separated, felted, and compressed to form hardboard, medium density fiberboard, or the like. Particle board, whether standard or treated to enhance its electrical conductivity, and oriented strand board are also within the definition of wood for this invention. Wood having a moisture content of from about 3 to about 10% by weight are most suitable for purpose of this invention.

The invention is surprising in several respects. As noted above, a coating powder formed from a carboxyl functional acrylic resin A), a curative i) and a polyester ii) does not provide a coating with desired physical properties, but if i) and ii) are adducted prior to forming the coating powder, a weatherable, flexible, impact resistant coating is formed. It is also surprising that best impact resistance is achieved with an acrylic resin having low carboxylic acid equivalent weight. S. C. Johnson product literature would lead one to expect highest impact resistance using acrylic resins having the highest carboxylic acid equivalent weight.

The invention will now be described in greater detail by way of specific examples.

EXAMPLES 1–9

REAGENTS

Morflex® 1000—A carboxylic acid-functional poly (hexanedioyl dodecanedioate) of carboxyl equivalent weight 740 prepared in our laboratories.

Resiflow® P-67—An acrylic flow aid, GCA Chemical Corp.

SCX™-815-B—A carboxylic acid-functional acrylic, S. C. Johnson, Corp.

SCX™-817C—A carboxylic acid-functional acrylic, S. C. Johnson, Corp.

SCX™-819—A carboxylic acid-functional acrylic, S. C. Johnson, Corp.

TGIC—PT 810 from Ciba Geigy Corporation.

Uraflow® B—Benzoin degassing aid, GCA Chemical Corp.

Examples 1–9 were formulated as follows. To 100 parts of the combination of resins and curing agents listed in Tables 2–4 were added, in each case, the following:

Resiflow® p-67 1.5 parts

Uraflow® B 0.8 parts

Raven #22 Black 2.0 parts

Each mixture was bag blended and extruded though a twin-screw 16 mm extruder with chilling of the feed zone and heating of the front zone to 110° C. The extrudate was chilled, chipped and ground, then electrostatically coated on 0.032" thick "Q" panels of cold-rolled steel. The coated panels were cured fifteen minutes at 375° F., and allowed to air-cool to room temperature before testing. Properties were measured on panels coated to between 1.8 and 2.2 mils.

CURING AGENT/FLEXIBILIZER ADDUCTS

Morflex® 1000 a carboxylic acid-functional poly (hexanedioyl dodecanedioate) polyester and PT-810 triglycidylisocyanonate (TGIC) were combined in the amounts listed in Table 1 in an appropriately-sized mechanically-stirred glass kettle under nitrogen atmosphere, and heated over about one hour to 170° C. The molten mass was stirred 30 minutes at 170° C., then discharged into a Teflon-lined pan and allowed to cool to a waxy solid.

The ratios of epoxy and acid functional groups in the charges, the fraction of each preparation which is polyester/curing agent adduct B) and the epoxy equivalent weights of the preparation are also listed in Table 1.

TABLE 1

CURING AGENT/FLEXIBILIZER ADDUCTS

| BLEND | TGIC (GRAMS) | MORFLEX ™ 1000 | EPOXY/ COOH RATIO | EEW (Grams per Epoxy Equiv.) |
|---|---|---|---|---|
| A* | 209.68 | 500.00 | 3:1 | 528 |
| B* | 559.10 | 1000.00 | 4:1 | 387 |
| C* | 109.40 | 150.00 | 5.22:1 | 305 |
| D* | 167.74 | 200.00 | 6:1 | 274 |

*TGIC-polyester adduct as portion of total curative (adduct plus free TGIC (A, 0.93; B, 0.89; C, 0.82; and D, 0.77.

TABLE 2

Effect of Curing Agent Adducts on Impact Resistance of Acid-Functional Acrylics

| Binder Components | Example 1 | Example 2 | Example 3 |
|---|---|---|---|
| SCX-817C Acid-Functional Acrylic | 90.6 | 76.6 | 76.6 |
| Poly(hexanedioyl dodecanedioate) | — | 13.5 | 13.5* |
| PT-810 TGIC | 9.4 | 9.8 | 9.8* |
| Impact Resistance (Direct/Reverse in Inch-lbs | 20/fail | 20/fail | 80/60 |

*An adduct/curing agent blend was formed by heating components together at 170° C. for 30 minutes, cooling and granulating before batching with the acrylic resin.

TABLE 3

Effect of Different Adduct/Curing Agent Ratios

| Component | Example 4 | Example 5 | Example 3 | Example 6 |
|---|---|---|---|---|
| SCX-817C Acid-Functional Acrylic | 65.45 | 72.1 | 76.6 | 78.5 |
| Blend A (Adduct) | 34.55 (32.1%)* | | | |
| Blend B (Adduct) | | 27.9 (24.8%)* | | |
| Blend C (Adduct) | | | 23.4 (19.2%)* | |
| Blend D (Adduct) | | | | 21.5 (16.6%)* |
| Impact (Dir/Rev) Resistance | 80/40 | 60/20 | 80/60 | 40/fail |
| MEK Resistance (1–5**) | 4 | 4 | 4 | 4 |
| Blocking Resistance (1**–10) | 4 | 4 | 4 | — |
| Pencil Hardness | B/F | F/H | F/H | F/2H |
| Gloss (20/60) | 35/76 | 73/87 | 71/86 | 79/90 |
| Smoothness (1–10**) | 6 (haze) | 7 | 7 | 7 |

*Adduct B) Fraction in Total Binder
**Desired Value

TABLE 4

Effect of Different Carboxylic Acid-Functional Acrylic Equivalent Weights

| Component | Example 7, | Example 5, | Example 8, | Example 9, |
|---|---|---|---|---|
| SCX-815B (1400 g/eq. COOH) | 78.35 | | | |
| SCX-817C (1000 g/eq. COOH) | | 72.1 | | |
| SCX-819 (750 g/eq. COOH) | | | 66.0 | 73.3 |
| Blend B (Adduct) | 21.65 (19.2%)* | 27.9 (24.8%)* | 34.0 (30.3%)* | |
| Blend D (Adduct) | | | | 26.7 (20.6%)* |
| Impact Resistance (Dir/Rev) | 20/fail | 60/20 | 160/160 | 160/160 |
| MEK Resistance(1–5**) | 4 | 4 | 4 | 4 |
| Blocking Resistance (1**–10) | — | 4 | — | 6 |
| Pencil Hardness | F/H | F/H | B/F | HB/H |
| Gloss (20°/60°) | 82/90 | 73/87 | 51/75 | 83/95 |
| Smoothness (1–10**) | 8 | 7 | 7–8 (haze) | 7–8 |

*Adduct Fraction in Total Binder
**Desired Value

EXAMPLE 10

Preparation of Blend E

A mixture of poly(hexanedioyl dodecanedioate) (620 g/eq. COOH), 1,400 g, and triglycidylisocyanurate (104 g/eq. epoxy), 896.32 g were heated together in a stirred reactor for 45 minutes at 140° C. to a viscosity of 3,500 centipoise. The reactor was discharged and the blend of curing agent and curing agent adduct cooled to a waxy solid.

EXAMPLE 11

Composition Containing Epoxy/Polyester Adduct But No Catalyst

A flexible, weatherable white powder coating composition for use on non-wood susbstrates at temperatures above 300° F. was prepared in accordance with the present invention by initially blending the following ingredients listed in Table 5.

TABLE 5

| Ingredient | phr | Material | Use |
| --- | --- | --- | --- |
| SCX-819 Acrylic Resin | 40.5 | Carboxylic Acid-Functional Acrylic Resin | Acrylic Resin |
| SCX-835 Acrylic Resin | 30.2 | Carboxylic Acid-Functional Acrylic Resin | Acrylic Resin |
| Blend E | 29.3 | Blend of Triglycidylisocyanurate and an Adduct of Triglycidylisocyanurate and Poly(hexandioyl dodecanedioate) | Flexibilizer |
| Triglycidylisocyanurate | — | Tri-Functional Epoxy | Curing Agent |
| Poly(hexanedioyl dodecanedioate) | — | Semi-Crylstalline Polyester | Flexibilizer |
| Troy EX-486 | 2.0 | Acrylic Polymer | Flow Additive |
| Benzoin | 0.8 | Benzoin | Flow Additive |
| R-960 | 50.0 | Titanium Dioxide | White Pigment |
| Ethyltriphenylphosphonium Bromide | — | Ethyltriphenylphosphonium Bromide | Cure Catalyst |
| Benzyltrimethylammonium Chloride | — | Benzyltrimethylammonium Chloride | Cure Catalyst |
| Epon Curing Agent P-101 | — | 2-Methyl Imiidazole Adduct (33 Wt. % Imidazole Residue) | Cure Catalyst |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 375° F. peak substrate temperature for about 20 minutes. Gel time and hot plate melt flow were tested on the powder coating. Direct impact, pencil hardness, flexibility, MEK resistance and gloss were tested on the metal panels and MEK resistance and texture on the wood panels. The coating thickness was about 2 to 3 mils. the resulting properties are given in Table 6.

TABLE 6

| Property | Result |
| --- | --- |
| Gel Time at 400° F. (sec) | 58 |
| Hot Plate Melt Flow at 375° F. (mm) | 40 |

TABLE 6-continued

| Property | Result |
| --- | --- |
| Direct Impact (in-lbs) | 60 |
| Reverse Impact (in-lbs) | 40 |
| Pencil Hardness (gouge) | H |
| Mandrel Flexibility | Pass |
| 60° Gloss | 84 |
| MEK (50 double rubs-on steel) | No Rub Off |
| MEK (50 double rubs-on wood) | No Rub Off |
| Texture (on steel) | Smooth |
| Texture (on wood) | Rough, Bubbles, Blisters |

EXAMPLE 12

Composition Containing Catalyst But No Adduct

A weatherable, but non-flexible white powder coating composition for use on wood susbstrates was prepared in accordance with the present invention by initially blending the following ingredients listed in Table 7.

TABLE 7

| Ingredient | phr | Material | Use |
| --- | --- | --- | --- |
| SCX-819 Acrylic Resin | 40.5 | Carboxylic Acid-Functional Acrylic Resin | Acrylic Resin |
| SCX-835 Acrylic Resin | 30.2 | Carboxylic Acid-Functional Acrylic Resin | Acrylic Resin |
| Blend E | — | Blend of Triglycidylisocyanurate and an Adduct of Triglycidylisocyanurate and Poly(hexandioyl dodecanedioate) | Flexibilizer |
| Triglycidylisocyanurate | 11.47 | Tri-Functional Epoxy | Curing Agent |
| Poly(hexanedioyl dodecanedioate) | 17.86 | Semi-Crylstalline Polyester | Flexibilizer |
| Troy EX-486 | 2.0 | Acrylic Polymer | Flow Additive |
| Benzoin | 0.8 | Benzoin | Flow Additive |
| R-960 | 50.0 | Titanium Dioxide | White Pigment |
| Ethyltriphenylphosphonium Bromide | 0.4 | Ethyltriphenylphosphonium Bromide | Cure Catalyst |
| Benzyltrimethylammonium Chloride | — | Benzyltrimethylammonium Chloride | Cure Catalyst |
| Epon Curing Agent P-101 | — | 2-Methyl Imiidazole Adduct (33 Wt. % Imidazole Residue) | Cure Catalyst |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 250° F. peak substrate temperature for about 30 minutes. Gel time and hot plate melt flow were tested on the powder coating. Direct impact, pencil hardness, flexibility, MEK resistance and gloss were tested on the metal panels and MEK resistance and texture on the wood panels. The coating thickness was about 2 to 3 mils. the resulting properties are given in Table 8.

TABLE 8

| Property | Result |
| --- | --- |
| Gel Time at 400° F. (sec) (mm) | 17 |
| Hot Plate Melt Flow at 375° F. (mm) | 67 |
| Direct Impact (in-lbs) | Fail |
| Reverse Impact (in-lbs) | Fail |
| Pencil Hardness (gouge) | Fail @ 2B |
| Mandrel Flexibility | Fail |
| 60° Gloss | 65 |
| MEK (50 double rubs-on steel) | Slight Rub Off |
| MEK (50 double rubs-on wood) | Slight Rub Off |
| Texture (on steel) | Medium Orange Peel |
| Texture (on wood) | Medium Orange Peel |

EXAMPLE 13

Composition Containing Catalyst and Triglycidylisocyanurate

A weatherable but non-flexible white powder coating composition for use on wood susbstrates was prepared in accordance with the present invention by initially blending the following ingredients listed in Table 9.

TABLE 9

| Ingredient | phr | Material | Use |
| --- | --- | --- | --- |
| SCX-819 Acrylic Resin | 51.0 | Carboxylic Acid-Functional Acrylic Resin | Acrylic Resin |
| SCX-835 Acrylic Resin | 38.0 | Carboxylic Acid-Functional Acrylic Resin | Acrylic Resin |
| Blend E | — | Blend of Triglycidylisocyanurate and an Adduct of Triglycidylisocyanurate and Poly(hexandioyl dodecanedioate) | Flexibilizer |
| Triglycidylisocyanurate | 11.0 | Tri-Functional Epoxy | Curing Agent |
| Poly(hexanedioyl dodecanedioate) | — | Semi-Crylstalline Polyester | Flexibilizer |
| Troy EX-486 | 2.0 | Acrylic Polymer | Flow Additive |
| Benzoin | 0.8 | Benzoin | Flow Additive |
| R-960 | 50.0 | Titanium Dioxide | White Pigment |
| Ethyltriphenylphosphonium Bromide | 0.4 | Ethyltriphenylphosphonium Bromide | Cure Catalyst |
| Benzyltrimethylammonium Chloride | — | Benzyltrimethylammonium Chloride | Cure Catalyst |
| Epon Curing Agent P-101 | — | 2-Methyl Imiidazole Adduct (33 Wt. % Imidazole Residue) | Cure Catalyst |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 250° F. peak substrate temperature for about 30 minutes. Gel time and hot plate melt flow were tested on the powder coating. Direct impact, pencil hardness, flexibility, MEK resistance and gloss were tested on the metal panels and MEK resistance and texture on the wood panels. The coating thickness was about 2 to 3 mils. the resulting properties are given in Table 10.

TABLE 10

| Property | Result |
| --- | --- |
| Gel Time at 400° F. (sec) | 14 |
| Hot Plate Melt Flow at 375° F. (mm) | 40 |
| Direct Impact (in-lbs) | 20 |
| Reverse Impact (in-lbs) | Fail |
| Pencil Hardness (gouge) | H |
| Mandrel Flexibility | Fail |
| 60° Gloss | 76 |
| MEK (50 double rubs-on steel) | Slight Rub Off |
| MEK (50 double rubs-on wood) | Slight Rub Off |
| Texture (on steel) | Tight Orange Peel |
| Texture (on wood) | Medium Organge Peel |

EXAMPLE 14

Composition Containing Epoxy/Polyester Adduct And Catalyst

A flexible, weatherable white powder coating composition for use on wood susbstrates was prepared in accordance with the present invention by initially blending the following ingredients listed in Table 11.

TABLE 11

| Ingredient | phr | Material | Use |
|---|---|---|---|
| SCX-819 Acrylic Resin | 40.5 | Carboxylic Acid-Functional Acrylic Resin | Acrylic Resin |
| SCX-835 Acrylic Resin | 30.2 | Carboxylic Acid-Functional Acrylic Resin | Acrylic Resin |
| Blend E | 29.3 | Blend of Triglycidylisocyanurate and an Adduct of Triglycidylisocyanurate and Poly(hexandioyl dodecanedioate) | Flexibilizer |
| Triglycidylisocyanurate | — | Tri-Functional Epoxy | Curing Agent |
| Poly(hexanedioyl dodecanedioate) | — | Semi-Crylstalline Polyester | Flexibilizer |
| Troy EX-486 | 2.0 | Acrylic Polymer | Flow Additive |
| Benzoin | 0.8 | Benzoin | Flow Additive |
| R-960 | 50.0 | Titanium Dioxide | White Pigment |
| Ethyltriphenylphosphonium Bromide | 0.4 | Ethyltriphenylphosphonium Bromide | Cure Catalyst |
| Benzyltrimethylammonium Chloride | — | Benzyltrimethylammonium Chloride | Cure Catalyst |
| Epon Curing Agent P-101 | — | 2-Methyl Imiidazole Adduct (33 Wt. % Imidazole Residue) | Cure Catalyst |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 250° F. peak substrate temperature for about 30 minutes. Gel time and hot plate melt flow were tested on the powder coating. Direct impact, pencil hardness, flexibility, MEK resistance and gloss were tested on the metal panels and MEK resistance and texture on the wood panels. The coating thickness was about 2 to 3 mils. the resulting properties are given in Table 12.

TABLE 12

| Property | Result |
|---|---|
| Gel Time at 400° F. (sec) | 14 |
| Hot Plate Melt Flow at 375° F. (mm) | 40 |
| Direct Impact (in-lbs) | 160 |
| Reverse Impact (in-lbs) | 140 |
| Pencil Hardness (gouge) | F |
| Mandrel Flexibility | Pass |
| 60° Gloss | 75 |
| MEK (50 double rubs-on steel) | No Rub Off |
| MEK (50 double rubs-on wood) | No Rub Off |
| Texture (on steel) | Tight Orange Peel |
| Texture (on wood) | Medium Orange Peel |

EXAMPLE 15

Composition Containing Epoxy/Polyester Adduct And Catalyst

A flexible, weatherable white powder coating composition for use on wood susbstrates was prepared in accordance with the present invention by initially blending the following ingredients listed in Table 13.

TABLE 13

| Ingredient | phr | Material | Use |
|---|---|---|---|
| SCX-819 Acrylic Resin | 40.5 | Carboxylic Acid-Functional Acrylic Resin | Acrylic Resin |
| SCX-835 Acrylic Resin | 30.2 | Carboxylic Acid-Functional Acrylic Resin | Acrylic Resin |
| Blend E | 29.3 | Blend of Triglycidylisocyanurate and an Adduct of Triglycidylisocyanurate and Poly(hexandioyl dodecanedioate) | Flexibilizer |
| Triglycidylisocyanurate | — | Tri-Functional Epoxy | Curing Agent |
| Poly(hexanedioyl dodecanedioate) | — | Semi-Crylstalline Polyester | Flexibilizer |
| Troy EX-486 | 2.0 | Acrylic Polymer | Flow Additive |
| Benzoin | 0.8 | Benzoin | Flow Additive |
| R-960 | 50.0 | Titanium Dioxide | White Pigment |
| Ethyltriphenylphosphonium Bromide | — | Ethyltriphenylphosphonium Bromide | Cure Catalyst |
| Benzyltrimethylammonium Chloride | 0.5 | Benzyltrimethylammonium Chloride | Cure Catalyst |

TABLE 13-continued

| Ingredient | phr | Material | Use |
|---|---|---|---|
| Epon Curing Agent P-101 | — | 2-Methyl Imiidazole Adduct (33 Wt. % Imidazole Residue) | Cure Catalyst |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 250° F. peak substrate temperature for about 30 minutes. Gel time and hot plate melt flow were tested on the powder coating. Direct impact, pencil hardness, flexibility, MEK resistance and gloss were tested on the metal panels and MEK resistance and texture on the wood panels. The coating thickness was about 2 to 3 mils. the resulting properties are given in Table 14.

TABLE 14

| Property | Result |
|---|---|
| Gel Time at 400° F. (sec) | 14 |
| Hot Plate Melt Flow at 375° F. (mm) | 42 |
| Direct Impact (in-lbs) | 160 |
| Reverse Impact (in-lbs) | 140 |
| Pencil Hardness (gouge) | H |
| Mandrel Flexibility | Pass |
| 60° Gloss | 75 |
| MEK (50 double rubs-on steel) | No Rub Off |
| MEK (50 double rubs-on wood) | No Rub Off |
| Texture (on steel) | Tight Orange Peel |
| Texture (on wood) | Medium Orange Peel |

EXAMPLE 16

Composition Containing Epoxy/Polyester Adduct And Catalyst

A flexible, weatherable white powder coating composition for use on wood susbstrates was prepared in accordance with the present invention by initially blending the following ingredients listed in Table 15.

TABLE 15

| Ingredient | phr | Material | Use |
|---|---|---|---|
| SCX-819 Acrylic Resin | 40.5 | Carboxylic Acid-Functional Acrylic Resin | Acrylic Resin |
| SCX-835 Acrylic Resin | 30.2 | Carboxylic Acid-Functional Acrylic Resin | Acrylic Resin |
| Blend E | 29.3 | Blend of Triglycidylisocyanurate and an Adduct of Triglycidylisocyanurate and Poly(hexandioyl dodecanedioate) | Flexibilizer |
| Triglycidylisocyanurate | — | Tri-Functional Epoxy | Curing Agent |
| Poly(hexanedioyl dodecanedioate) | — | Semi-Crylstalline Polyester | Flexibilizer |
| Troy EX-486 | 2.0 | Acrylic Polymer | Flow Additive |
| Benzoin | 0.8 | Benzoin | Flow Additive |
| R-960 | 50.0 | Titanium Dioxide | White Pigment |
| Ethyltriphenylphosphonium Bromide | — | Ethyltriphenylphosphonium Bromide | Cure Catalyst |
| Benzyltrimethylammonium Chloride | — | Benzyltrimethylammonium Chloride | Cure Catalyst |
| Epon Curing Agent P-101 | 2.0 | 2-Methyl Imiidazole Adduct (33 Wt. % Imidazole Residue) | Cure Catalyst |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 250° F. peak substrate temperature for about 30 minutes. Gel time and hot plate melt flow were tested on the powder coating. Direct impact, pencil hardness, flexibility, MEK resistance and gloss were tested on the metal panels and MEK resistance and texture on the wood panels. The coating thickness was about 2 to 3 mils. the resulting properties are given in Table 16.

TABLE 16

| Property | Result |
|---|---|
| Gel Time at 400° F. (sec) | 7 |
| Hot Plate Melt Flow at 375° F. (mm) | 20 |
| Direct Impact (in-lbs) | 60 |
| Reverse Impact (in-lbs) | 20 |
| Pencil Hardness (gouge) | F |

TABLE 16-continued

| Property | Result |
|---|---|
| Mandrel Flexibility | Pass |
| 60° Gloss | 24 |
| MEK (50 double rubs-on steel) | No Rub Off |
| MEK (50 double rubs-on wood) | No Rub Off |
| Texture (on steel) | Pebbly, Continuous Film |
| Texture (on wood) | Low Gloss |

What is claimed is:

1. A method of providing a coating on wood comprising, applying to said wood a coating powder of composition consisting essentially of
   A) between about 60 and about 90 wt %, relative to total weight of A) plus B) plus C), of an acrylic polymer having a weight average molecular weight of between about 1000 and about 30,000, a carboxylic acid equivalent weight of from about 500 to about 1000 and a glass transition temperature of about 45° C. or above,
   B) between about 5 and about 30 wt %, relative to total weight of A) plus B) plus C) of an adduct prepared from
      i) between about 20 and about 50 wt %, relative to total weight of i) plus ii), of a polyepoxy compound or a poly (beta-hydroxyalkyl amide) compound, and
      ii) between about 50 and about 80 wt %, relative to total weight of i) plus ii), of a carboxylic acid-functional polyester resin, said polyester resin being the condensation product of polyols and polycarboxylic acids, said polyols are linear aliphatic diols and said polycarboxylic acids are linear aliphatic dicarboxylic acids,
   C) between about 2 and about 30 wt %, relative of the total weight of A) plus B) plus C) of a polyepoxy compound or a poly (beta-hydroxyalkyl amide) compound; the combination of said adduct B) and C) having un-reacted functional groups of component i) plus C) of a stoichiometric equivalent relative to said carboxylic acid functionality of said acrylic polymer A) of between about 0.5 and about 1.5, and
   D) cure catalyst in an amount sufficient that said composition cures at about 300° F. (149° C.) or below for 30 min.,
   fusing said coating powder on said wood, and
   curing said coating powder.

2. The method according to claim 1 wherein said composition contains sufficient catalyst D) to cure said composition at about 250° F. (121 ° C.) or below for 30 min.

* * * * *